(12) United States Patent
Shiobara et al.

(10) Patent No.: US 7,829,651 B2
(45) Date of Patent: Nov. 9, 2010

(54) LENS-FORMING SILICONE RESIN COMPOSITION AND SILICONE LENS

(75) Inventors: Toshio Shiobara, Annaka (JP); Tsutomi Kashiwagi, Annaka (JP); Katsuyuki Imazawa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 488 days.

(21) Appl. No.: 11/437,662

(22) Filed: May 22, 2006

(65) Prior Publication Data

US 2006/0264567 A1    Nov. 23, 2006

(30) Foreign Application Priority Data

May 23, 2005    (JP)    ............... 2005-149307

(51) Int. Cl.
*C08G 77/00* (2006.01)
*C08G 77/04* (2006.01)

(52) U.S. Cl. ............... 528/32; 528/10; 528/12; 528/15; 528/33

(58) Field of Classification Search ............... 528/15, 528/32, 33.1, 12
See application file for complete search history.

(56) References Cited

U.S. PATENT DOCUMENTS 3,516,957 A  *  6/1970  Carroll, Jr. et al. ........... 524/315
3,974,122 A  *  8/1976  Sato et al. ................... 524/500
6,285,513 B1     9/2001  Tsuji et al.
6,432,137 B1  *  8/2002  Nanushyan et al. ........ 623/6.11

FOREIGN PATENT DOCUMENTS

| JP | 3-766 | 1/1991 |
| JP | 2000-17176 | 1/2000 |
| JP | 2000-231002 | 8/2000 |
| JP | 2004-221308 | 8/2004 |

OTHER PUBLICATIONS

Japanese Office Action mailed Dec. 24, 2009, issued in corresponding Japanese Patent Application No. 2005-149307.

* cited by examiner

*Primary Examiner*—Randy Gulakowski
*Assistant Examiner*—Robert Loewe
(74) *Attorney, Agent, or Firm*—Westerman, Hattori, Daniels & Adrian, LLP

(57) ABSTRACT

Silicone resin compositions comprising (A) an organopolysiloxane containing at least two aliphatic unsaturated bonds, (B) an organohydrogenpolysiloxane having at least two silicon-bonded hydrogen atoms in a molecule, (C) a platinum group metal base catalyst, and (D) a mold release agent cure into colorless, transparent, heat resistant parts which can be smoothly released from the mold and used as lenses in LED devices.

7 Claims, 1 Drawing Sheet

(2)

(1)

LENS-FORMING SILICONE RESIN COMPOSITION AND SILICONE LENS

CROSS-REFERENCE TO RELATED APPLICATION

This non-provisional application claims priority under 35 U.S.C. §119(a) on Patent Application No. 2005-149307 filed in Japan on May 23, 2005, the entire contents of which are hereby incorporated by reference.

TECHNICAL FIELD

This invention relates to a silicone resin composition of the addition cure type for forming lenses, and more particularly, to a silicone resin composition with ease of molding for forming substantially surface tack-free silicone lenses having improved transparency. It also relates to a silicone lens obtained by molding and curing the silicone resin composition and suited for use in LED devices.

BACKGROUND ART

Lenses for use in light-emitting diode (LED) devices are mass manufactured by mechanical forming such as injection molding. Although prior art lenses are molded using thermoplastic resins such as acrylic resins and polycarbonate resins, the currently increasing power of LED devices invites the problem that thermoplastic resins' heat resistance and discoloration resistance are short.

Also, lead-free solders are often used nowadays. Since the lead-free solders have a higher melting temperature than conventional solders, optical devices are usually soldered to substrates while heating at a temperature of 260° C. or higher. When soldering at such high temperature, lenses of prior art thermoplastic resins can no longer be used because the lenses will deform or yellow due to the heat.

Under the circumstances, a number of studies have been made on the use of silicone resins in the lenses associated with LED or the like. When lenses are manufactured from silicone resins by forming techniques such as injection molding, mold release agents are directly applied to the metal mold by spraying or the like to provide for smooth release from the metal mold. The step of spraying the mold release agent is not so desirable in view of productivity. In addition, the surface of molded parts is altered by the transfer of the mold release agent to the molded parts. This is one of factors that detract from transparency.

The references pertinent to the present invention include JP-A 2000-231002 corresponding to U.S. Pat. No. 6,285,513, JP-A 2000-17176, and JP-A 2004-221308.

DISCLOSURE OF THE INVENTION

An object of the invention is to provide a lens-forming silicone resin composition that has overcome the drawbacks of the prior art and offers a transparent cured part which can be smoothly released from the metal mold; and a silicone lens obtained by molding and curing the composition.

The inventors have found that a lens-forming silicone resin composition comprising the following components attains the above and other objects while improving the mold release.

The present invention provides a lens-forming silicone resin composition comprising as essential components, (A) an organopolysiloxane containing at least two aliphatic unsaturated bonds in a molecule, (B) an organohydrogenpolysiloxane having at least two silicon-bonded hydrogen atoms in a molecule, (C) a platinum group metal base catalyst, and (D) a mold release agent, the composition becoming colorless and transparent when cured.

Also contemplated herein is a silicone lens obtained by molding and curing the silicone resin composition.

BENEFITS OF THE INVENTION

By molding and curing the silicone resin composition of the invention, colorless, transparent, heat resistant silicone lenses can be manufactured. Another advantage is smooth release of molded parts or lenses from the mold. The lenses are suited for use in LED devices.

DESCRIPTION OF THE PREFERRED EMBODIMENTS

Component A

Figure 1:
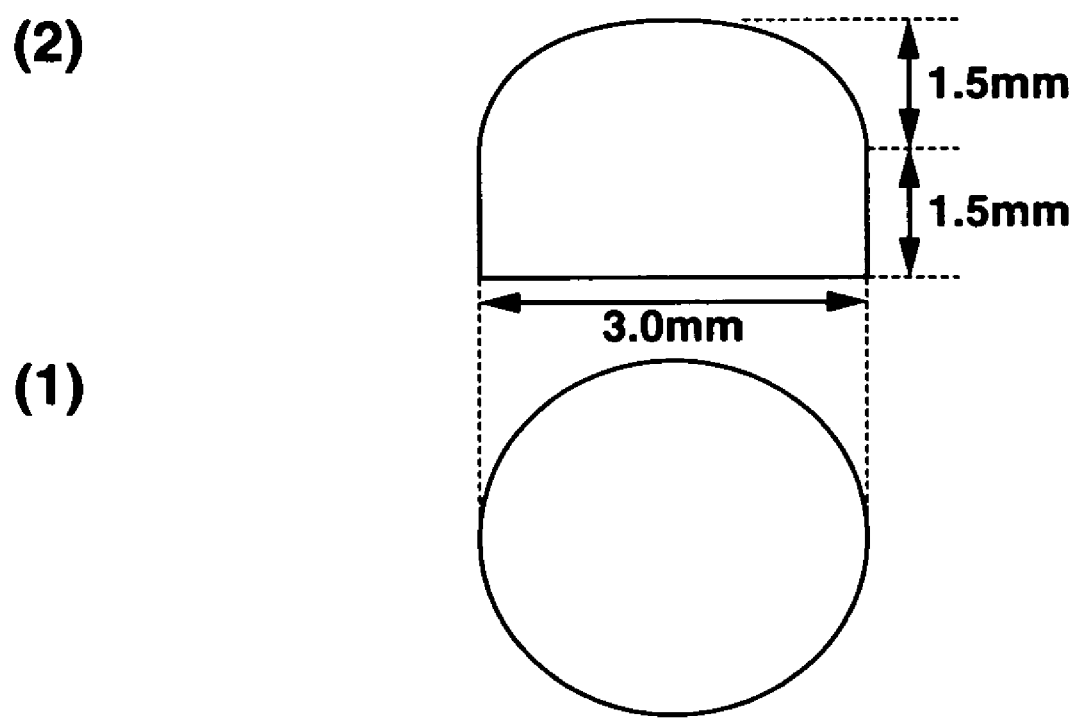
FIG. 1 schematically illustrates the shape of a lens molded from the compositions of Examples and Comparative Examples, FIG. 1(1) being a plane view and FIG. 1(2) being a side view.

Component (A) is any of organopolysiloxanes containing in a molecule at least two silicon-bonded aliphatic unsaturated bonds, typically alkenyl groups of 2 to 8 carbon atoms, preferably 2 to 6 carbon atoms, such as vinyl and allyl. They should preferably have a viscosity of at least 100 mPa·s at 25° C. Of these, linear organopolysiloxanes, represented by the following formula (1), containing at least one alkenyl group on the silicon atom at either end of the molecular chain and having a viscosity of at least 100 mPa·s at 25° C. are desired for efficient working and curing.

When lenses are manufactured by a molding machine such as an injection molding machine, a resin with too low a viscosity will penetrate into ejector pin-mold junctures and parting lines, giving rise to the trouble that lenses are formed with burrs or the ejector pins become inoperable even when the mold is opened. For this reason, a viscosity of at least 100 mPa·s is necessary. If the viscosity exceeds 1,000,000 mPa·s, thorough mixing by a static mixer may be impeded. Thus the viscosity should preferably be less than or equal to 1,000,000 mPa·s.

It is noted that the linear organopolysiloxane may contain a small proportion of branched structure (trifunctional siloxane units) in the molecular chain.

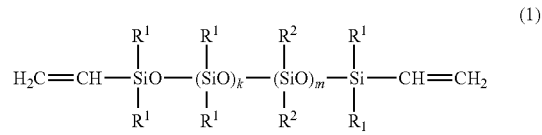
(1)

Herein $R^1$ is each independently a substituted or unsubstituted monovalent hydrocarbon group, $R^2$ is each independently an aliphatic unsaturation-free, substituted or unsubstituted monovalent hydrocarbon group, k and m each are 0 or a positive integer, k+m is such a number that the organopolysiloxane has a viscosity of 100 to 1,000,000 mPa·s at 25° C.

The monovalent hydrocarbon groups represented by $R^1$ are preferably those of 1 to 10 carbon atoms, more preferably of 1 to 6 carbon atoms, for example, alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl; and substituted forms of the foregoing in which some or all hydrogen atoms are substituted by halogen atoms (fluoro, bromo, chloro) or cyano groups, including halogenated alkyl groups such as chloromethyl, chloropropyl, bromoethyl and trifluoropropyl, and cyanoethyl.

The monovalent hydrocarbon groups represented by $R^2$ are also preferably those of 1 to 10 carbon atoms, more preferably of 1 to 6 carbon atoms, examples of which are the same as exemplified above for $R^1$, with the proviso that alkenyl groups are excluded.

The subscripts k and m each are 0 or a positive integer, typically satisfying $5 \leq k+m \leq 10,000$. Preferably k and m are positive integers satisfying $10 \leq k+m \leq 2,000$ and $0 > k/(k+m) \leq 0.2$.

Illustrative, non-limiting examples of the organopolysiloxane (A) are given below.

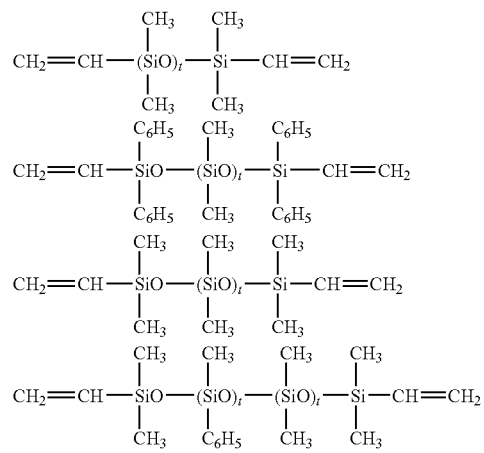

In these formulae, t is an integer of 8-2000.

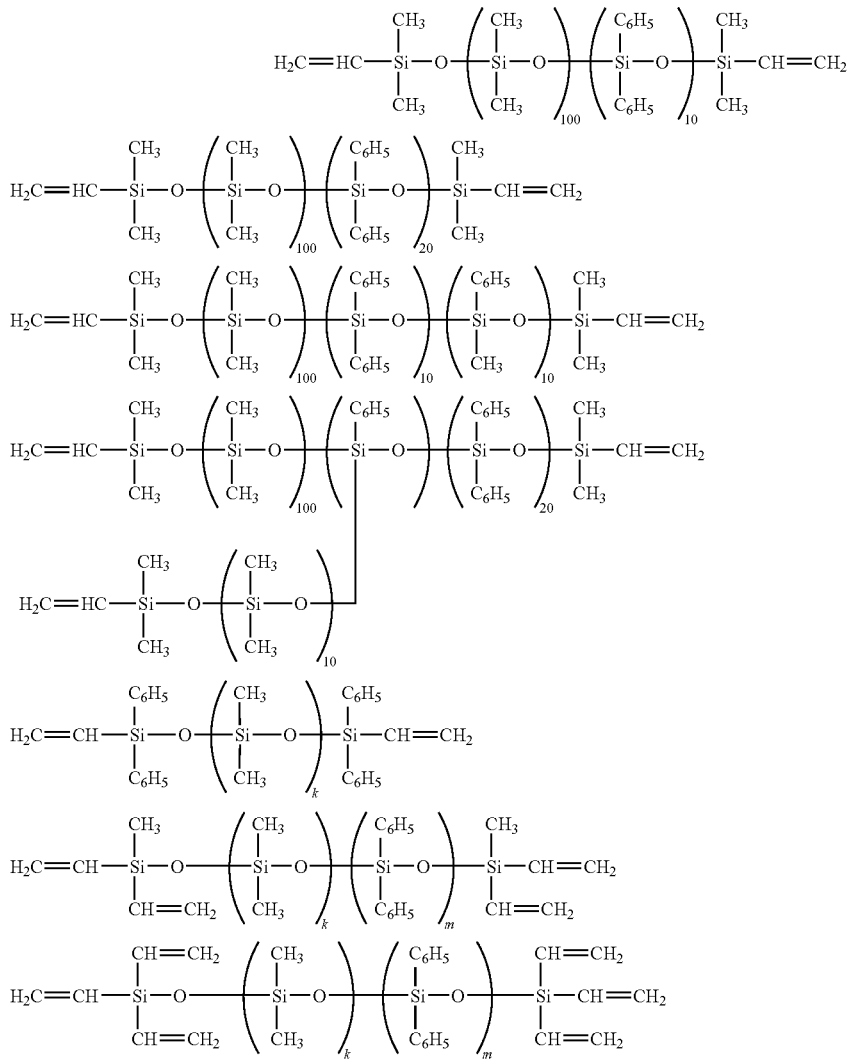

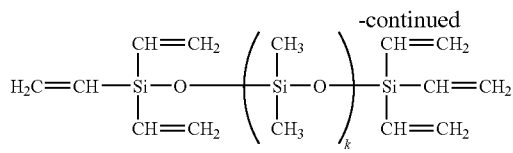

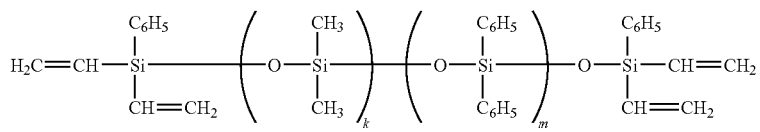

In these formulae, k and m are as defined above.

Also employable as component (A) are organopolysiloxanes of resin structure. The preferred organopolysiloxanes of resin structure are vinyl-containing organopolysiloxanes having the average compositional formula:

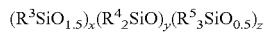

wherein $R^3$, $R^4$ and $R^5$ are each independently a substituted or unsubstituted monovalent hydrocarbon group, 2 to 45 mol % of the entire monovalent hydrocarbon groups being vinyl, x, y and z representative of the molar ratio of corresponding siloxane units are such numbers that x/(x+y+z) is from 0.3 to 0.95, y/(x+y+z) is from 0.05 to 0.50, and z/(x+y+z) is from 0 to 0.05.

The monovalent hydrocarbon groups represented by $R^3$, $R^4$ and $R^5$ include those of 1 to 10 carbon atoms, preferably 1 to 8 carbon atoms, for example, alkyl groups such as methyl, ethyl and propyl, alkenyl groups such as vinyl, and aryl groups such as phenyl. Halogenated forms of these hydrocarbon groups are also included. It is requisite that 2 to 45 mol %, especially 5 to 30 mol % of the entire monovalent hydrocarbon groups be vinyl. If the number of vinyl groups is less than 2 mol %, the addition reaction with component (B) to be described later results in a low crosslinking density, failing to form molded parts with improved mechanical strength. If the number of vinyl groups is more than 45 mol %, molded parts may become brittle.

The subscripts x, y and z representative of the molar ratio of corresponding siloxane units are numbers as defined above, and preferably such numbers that x/(x+y+z) is from 0.4 to 0.8, y/(x+y+z) is from 0.1 to 0.5, and z/(x+y+z) is from 0 to 0.04.

These vinyl-containing organopolysiloxanes can be obtained by co-hydrolytic condensation of a mixture of two or more halosilanes or alkoxysilanes corresponding to the respective siloxane units.

Illustrative examples of the respective siloxane units in the above average compositional formula include monovinylsiloxane, monomethylsiloxane, monoethylsiloxane, monophenylsiloxane, divinylsiloxane, phenylvinylsiloxane, methylphenylsiloxane, diphenylsiloxane, dimethylsiloxane, trivinylsiloxane, divinylmethylsiloxane, divinylphenylsiloxane, vinyldimethylsiloxane, vinylphenylmethylsiloxane, trimethylsiloxane, dimethylphenylsiloxane, methyldiphenylsiloxane, triphenylsiloxane, etc., and substituted siloxanes in which hydrogen atoms of organic groups are substituted by halogen or the like.

It is noted that the inclusion of $SiO_2$ units is acceptable as long as this does not compromise the objects of the invention.

Component B

Component (B) is an organohydrogenpolysiloxane which serves as a crosslinking agent such that addition reaction takes place between SiH groups in component (B) and vinyl groups in component (A) to form a cured product. It may be any of organohydrogenpolysiloxanes having at least two silicon-bonded hydrogen atoms (i.e., SiH groups) in a molecule.

Preferred are organohydrogenpolysiloxanes having the average compositional formula:

$$H_a(R^6)_b SiO_{(4-a-b)/2} \quad (2)$$

wherein $R^6$ is each independently an aliphatic unsaturation-free, substituted or unsubstituted monovalent hydrocarbon group, a and b are. positive numbers satisfying $0.001 \leq a < 2$, $0.7 \leq b \leq 2$, and $0.8 \leq a+b \leq 3$. The organohydrogenpolysiloxanes should have at least two (typically 2 to about 200), preferably at least three (typically 3 to about 100) silicon-bonded hydrogen atoms (SiH groups) in a molecule.

More particularly, $R^6$ in formula (2) may be the same or different and is a substituted or unsubstituted monovalent hydrocarbon group free of aliphatic unsaturation, preferably having 1 to 10 carbon atoms, more preferably 1 to 7 carbon atoms, for example, lower alkyl groups such as methyl, aryl groups such as phenyl, and the like, as exemplified above for $R^2$ in formula (1). The subscripts a and b are positive numbers satisfying $0.001 \leq a < 2$, $0.7 \leq b \leq 2$, and $0.8 \leq a+b \leq 3$, and preferably $0.05 \leq a \leq 1$, $0.8 \leq b \leq 2$, and $1 \leq a+b \leq 2.7$. The location of silicon-bonded hydrogen atoms is not particularly limited, and may be either an end or an intermediate of the molecular chain.

Examples of the organohydrogenpolysiloxane include tris (dimethylhydrogensiloxy)methylsilane, tris(dimethylhydrogensiloxy)phenylsilane, 1,1,3,3-tetramethyldisiloxane, 1,3,5,7-tetramethylcyclotetrasiloxane, both end trimethylsiloxy-blocked methylhydrogenpolysiloxane, both end trimethylsiloxy-blocked dimethylsiloxane-methylhydrogensiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane copolymers, both end trimethylsiloxy-blocked methylhydrogensiloxane-diphenylsiloxane-dimethylsiloxane copolymers, copolymers of $(CH_3)_2 HSiO_{1/2}$ units and $SiO_{4/2}$ units, and copyolymers of $(CH_3)_2 HSiO_{1/2}$ units, $SiO_{4/2}$ units, and $(C_6H_5)SiO_{3/2}$ units.

Compounds of the structure shown below are also useful.

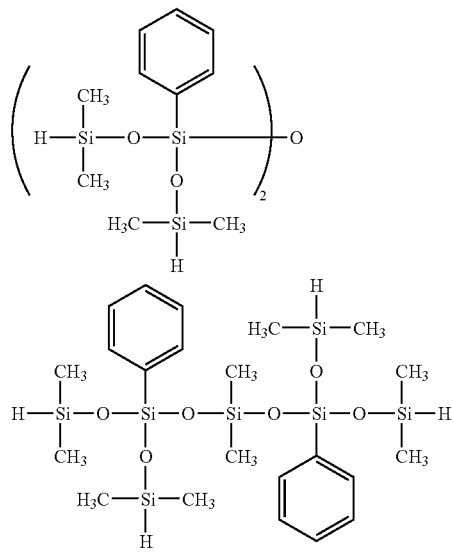

The molecular structure of the organohydrogenpolysiloxane may be linear, cyclic, branched or three-dimensional network. Preferably, the number of silicon atoms per molecule or the degree of polymerization is about 3 to about 1,000, preferably about 3 to about 300.

Such an organohydrogenpolysiloxane is generally prepared through hydrolysis of chlorosilanes such as $R^6SiHCl_2$, $(R^6)_3SiCl$, $(R^6)_2SiCl_2$ and $(R^6)_2SiHCl$, wherein $R^6$ is as defined above, or hydrolysis of chlorosilanes and subsequent equilibration of the resultant siloxane.

The organohydrogenpolysiloxane may be compounded in an effective amount for component (A) to cure, preferably in such amounts that the molar ratio of SiH groups to the total of alkenyl groups (e.g., vinyl) in component (A) is 0.1-4.0:1, more preferably 1.0-3.0:1, and most preferably 1.2-2.8:1. A molar ratio of less than 0.1 may allow curing reaction to proceed little and make it difficult to produce cured silicone. If the molar ratio is more than 4.0, more SiH groups may be left unreacted in the cured composition which will change its physical properties with time.

Component C

The platinum group metal-based catalyst is compounded for inducing addition cure reaction to the inventive composition. Platinum, palladium and rhodium base catalysts are included. Of these, platinum base catalysts are preferred from the economical standpoint. Examples include platinum, platinum black and chloroplatinic acid, and more specifically $H_2PtCl_6.mH_2O$, $K_2PtCl_6$, $KHPtCl_6.mH_2O$, $K_2PtCl_4$, $K_2PtCl_4.mH_2O$, and $PtO_2.mH_2O$ wherein m is a positive integer, and complexes thereof with hydrocarbons (e.g., olefins), alcohols and vinyl-containing organopolysiloxanes. They may be used alone or in admixture. The catalyst (C) may be used in a catalytic amount, specifically in an amount to give about 0.1 to 1,000 ppm, more preferably about 0.5 to 200 ppm of platinum group metal based on the weight of components (A) and (B) combined.

Component D

The mold release agent (D) is used such that after the silicone resin composition of the invention is pressured molded and cured in a mold, the molded composition may be removed from the mold without damages. The mold release agent must be fully compatible with the silicone resin composition and ensure that cured parts are colorless and transparent. When the cured parts are used as lenses to be coupled with blue or white LED's, the cured parts must be not only transparent, but also free from deterioration by short wavelength light or discoloration at elevated temperature.

The mold release agents meeting these requirements are useful. Suitable mold release agents include fatty acid derivatives commercially available from Riken Vitamin Co., Ltd. as Rikemar AZ-01, Rikemar B-100, Rikemar HC-100, Rikemar HC-200, Rikemar S-95, Rikemar S-200, Rikemar TG-12, Rikestar EW-100, Rikestar EW-200, Rikestar EW-250, Rikestar EW-400, Rikestar EW-440A, and Rikestar HT-10; polyethylene derivatives commercially available from Clariant Co. as LICOWAX PED 136, LICOWAX PED 153, and LICOWAX PED 371FP, and from Hoechst as HOE WAX PE 130 PDR, HOE WAX PED 191 PDR, HOE WAX PE 191 PDR, HOE WAX PE 191 Flakes, and HOE WAX PE 520 Powder; carnauba waxes commercially available from Toa Kasei Co., Ltd. as YTS-040625-03, Carnauba/Candelilla, and Refined Granular Carnauba; and montanic esters commercially available from Clariant Co. as LICOLUBU WE40. Inter alia, mold release agents in the form of fatty acid derivatives and fatty acid esters of erythritol derivatives are excellent in compatibility with silicone resins, transparency after curing, and discoloration resistance upon high-temperature holding.

Examples of fatty acid derivatives and fatty acid esters of erythritol derivatives which can be used as the mold release agent include pentaerythritol tetrastearate, dipentaerythritol adipic/stearic ester, glycerin tri-18-hydroxystearate, pentaerythritol full-stearate, polyethylene oxide, highly esterified carnauba, Rikemar TG-12 (glycerin tri-18-hydroxystearate), Rikestar EW-440A (pentaerythritol tetrastearate), LICOWAX PED136 (polyethylene oxide), Electol D-121-41 (polypropylene/maleic anhydride copolymer), Rikestar EW-200 (pentaerythritol adipic/stearic ester), and Rikestar EW-400 (pentaerythritol full-stearate).

When the composition in which the mold release agent is compounded in an amount of 0.05 to 5% by weight based on the weight of components (A) and (B) combined is injection molded or otherwise formed, the molded parts, typically lenses can be smoothly taken out of the mold. If the amount of the mold release agent is less than 0.05 wt %, the release of molded parts from the mold is insufficiently improved so that in continuous molding, the release property becomes unacceptable after about 50 shots. Then the mold must be cleaned at intervals to improve the release property, leading to a reduced productivity. If the amount of the mold release agent is more than 5 wt %, an excess of the mold release agent will bleed out on the lens surface, detracting from lens performance. The mold release agent may be added to a mixture of the base and the curing agent, or separately to the base and the curing agent or to either one.

The silicone resin composition of the invention is prepared by intimately mixing the above-mentioned components. Most often, the composition is stored in two packages so that no cure occurs. On use, the two packages are combined, allowing the composition to cure. The composition may, of course, be of one-package type if a small amount of a cure inhibitor such as acetylene alcohol is added.

Optionally, well-known additives including antioxidants, ultrafine silica such as Aerosil®, and inorganic fillers having a matching refractive index with the silicone resin may be compounded for the purposes of improving mechanical strength, adjusting a coefficient of expansion or the like as long as this is not detrimental to transparency.

When lenses are manufactured by injection molding or otherwise forming the silicone resin composition, the composition of two-package type is more productive because rapid reaction occurs after mixing of the two packages. For mixing, an ordinary mixing device such as a static mixer is used. The mixture is directly fed to an injection molding machine and molded in the mold. The molding conditions are not particularly limited and include a temperature of 120 to 180° C. and a time of about 30 to 90 seconds although exact molding conditions depend on the curability of the silicone resin composition. The composition may be post-cured at 100 to 200° C. for 5 minutes to 4 hours if desired.

The silicone resin composition of the invention cures into colorless transparent parts and is thus suitable for the manufacture of lenses including lenses for LED devices, laser pickup lenses and high-temperature resin lenses.

EXAMPLE

Examples and Comparative Examples are given below for further illustrating the invention, but the invention is not limited thereto. In Examples, all parts are by weight, the viscosity is as measured at 25° C. by a rotational viscometer, and Vi stands for vinyl.

Reference Example 1

With vigorous stirring, a mixture of 698 parts of phenyltrichlorosilane, 169 parts of methylvinyldichlorosilane, 194 parts of dimethyldichlorosilane and 530 parts of toluene was added dropwise to 2,500 parts of water over 60 minutes. Stirring was continued for a further 60 minutes, after which the toluene solution was washed with water until neutral. After water washing, the toluene solution was adjusted to a siloxane concentration of 25%. 0.42 part of potassium hydroxide was added to the toluene solution which was heated under reflux for 5 hours for polymerization. Then 13.8 parts of trimethylchlorosilane was added to the solution, followed by stirring for 60 minutes at room temperature, neutralization of the alkali, and removal of residual silanol groups. This was filtered and heated under vacuum for distilling off the toluene, leaving a transparent vinyl-bearing organopolysiloxane.

Example 1

To 50 parts of a polysiloxane (VF) having the formula (i) were added 50 parts of a vinylmethylsiloxane (VMQ) of resin structure consisting of 50 mol % $SiO_2$ units, 42.5 mol % $(CH_3)_3SiO_{0.5}$ units and 7.5 mol % $Vi_3SiO_{0.5}$ units, an amount to give a 1.5-fold molar amount of SiH groups relative to the total of vinyl groups in the VF and VMQ components of an organohydrogenpolysiloxane having the formula (ii) and 0.05 part of an octyl alcohol-modified chloroplatinic acid solution. By thoroughly mixing the ingredients, a silicone resin composition was prepared.

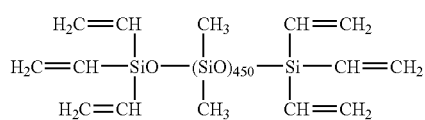

(i)

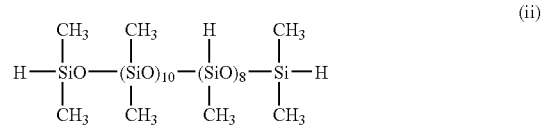

(ii)

To 100 parts of the composition, 1.0 part of a fatty acid based mold release agent (Rikestar EW-440A, pentaerythritol tetrastearate, Riken Vitamin Co., Ltd.) was added. The ingredients were thoroughly agitated and mixed into a mold release agent-containing silicone resin composition.

Example 2

A silicone resin composition was prepared by mixing 100 parts of the vinyl-bearing organopolysiloxane obtained in Reference Example 1 with 30 parts of an organohydrogenpolysiloxane having the following formula and 0.05 part of a 1% octyl alcohol-modified chloroplatinic acid solution.

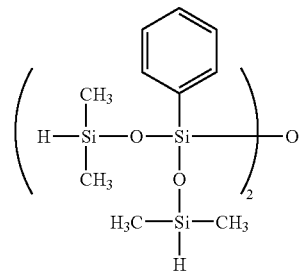

To 100 parts of the composition, 1.0 part of a fatty acid based mold release agent (RIKESTAR EW-440A, pentaerythritol tetrastearate, Riken Vitamin Co., Ltd.) was added. The ingredients were thoroughly agitated and mixed into a mold release agent-containing silicone resin composition.

Examples 3 to 6

Mold release agent-containing silicone resin compositions were prepared as in Example 2 except that the amount of the mold release agent was changed to 0.07, 0.2, 0.5 and 3 parts.

Examples 7 to 10

Mold release agent-containing silicone resin compositions were prepared as in Example 2 except that the fatty acid based mold release agent was replaced by 0.2 part of RIKESTAR EW-100 (dipentaerythritol adipic stearic ester, Riken Vitamin Co., Ltd.), RIKEMAR TG-12 (glycerin tri-18-hydroxystearate, Riken Vitamin Co., Ltd.), RIKESTAR EW-400 (pentaerythritol full stearate, Riken Vitamin Co., Ltd.), LICOWAX PED 153 (polyethylene oxide, Clariant Co.), and YTS-040625-03 (highly esterified carnauba, Toa Kasei Co., Ltd.).

Comparative Example 1

This example is the silicone resin composition prepared in Example 2 prior to compounding of the mold release agent.

Comparative Examples 2-3

Mold release agent-containing silicone resin compositions were prepared as in Example 2 except that the mold release agent was replaced by 0.2 part of NF-100 (Nikko Fine Product Co., Ltd.) or KAO WAX EBF (Kao Corp.).

From the silicone resin compositions of Examples 1-10 and Comparative Examples 1-3, lenses were molded using an injection molding machine equipped with a multiple-cavity mold capable of forming 16 parts in one shot. Tests were performed with respect to continuous molding, heat resistance, light transmittance and wax bleeding. The lens has a dome shape as shown in FIG. 1.

Continuous Molding

The silicone resin composition was continuously molded under conditions: an injection pressure of 20 MPa·s, a curing temperature of 150° C., and a curing time of 45 seconds. The number of shots repeated until the molding process became deficient was counted. The molding process was judged deficient when the resin penetrated around ejector pins so that the ejector pins became inoperable, when mold stains due to wax bleeding were observed, and when lenses chipped due to impeded release.

Heat Resistance

The lenses which had been molded under the above-described conditions were post-cured at 150° C. for 4 hours, and then passed sequentially three times through an IR reflow oven which was set so as to hold the lens at the peak temperature of 260° C. for 15 seconds. It was observed whether the lenses were discolored or deformed.

Transmittance at Wavelength 400 nm

Each silicone resin composition was injection molded under the same conditions as used in the continuous molding test, into a test piece of 1 mm thick. The test piece was post-cured at 150° C. for 4 hours and measured for light transmittance at 400 nm. It was then held in a dryer at 200° C. for a predetermined time (24, 48 hours), taken out, and measured for light transmittance again.

Wax Bleeding on Lens Surface

After 100 shots and 500 shots of continuous molding, the surface of lenses were observed to see whether or not the wax bled out.

The results are shown in Tables 1 to 3.

TABLE 3

|  |  | Comparative Example | | |
|---|---|---|---|---|
|  |  | 1 | 2 | 3 |
| Continuous molding |  | 40 | 1,000 | 1,000 |
| Heat resistance |  | unchanged | discolored | unchanged |
| Transmittance | Initial | 97% | 93% | 90% |
| at 400 nm | 200° C./24 hours | 95% | 85% | 89% |
|  | 200° C./48 hours | 95% | 75% | 85% |
| Wax bleeding on lens surface |  | no | bled | bled |

Japanese Patent Application No. 2005-149307 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A lens-forming silicone resin composition consisting essentially of
   (A) an organopolysiloxane containing at least two aliphatic unsaturated bonds in a molecule,
   (B) an organohydrogenpolysiloxane having at least two silicon-bonded hydrogen atoms in a molecule,
   (C) a platinum group metal base catalyst, and
   (D) a mold release agent being a fatty acid ester of an erythritol derivative, the composition becoming colorless and transparent when cured.

2. The composition of claim 1 wherein component (A) is an organopolysiloxane having the general formula (1):

TABLE 1

|  |  | Example | | | | |
|---|---|---|---|---|---|---|
|  |  | 1 | 2 | 3 | 4 | 5 |
| Continuous molding |  | 1,000 | 1,000 | 850 | 1,000 | 1,000 |
| Heat resistance |  | unchanged | unchanged | unchanged | unchanged | unchanged |
| Transmittance | Initial | 98% | 98% | 97% | 97% | 98% |
| at 400 nm | 200° C./24 hours | 95% | 95% | 95% | 95% | 95% |
|  | 200° C./48 hours | 93% | 93% | 95% | 95% | 94% |
| Wax bleeding on lens surface |  | no | no | no | no | no |

TABLE 2

|  |  | Example | | | | |
|---|---|---|---|---|---|---|
|  |  | 6 | 7 | 8 | 9 | 10 |
| Continuous molding |  | 1,000 | 1,000 | 1,000 | 1,000 | 1,000 |
| Heat resistance |  | unchanged | unchanged | unchanged | unchanged | unchanged |
| Transmittance | Initial | 96% | 97% | 98% | 98% | 97% |
| at 400 nm | 200° C./24 hours | 95% | 96% | 95% | 94% | 95% |
|  | 200° C./48 hours | 93% | 94% | 93% | 92% | 94% |
| Wax bleeding on lens surface |  | no | no | no | no | no |

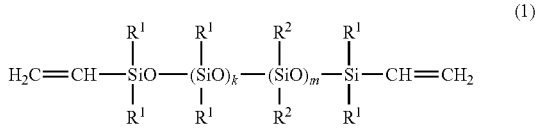
(1)

wherein $R^1$ is each independently a substituted or unsubstituted monovalent hydrocarbon group, $R^2$ is each independently an aliphatic unsaturation-free, substituted or unsubstituted monovalent hydrocarbon group, k and m each are 0 or a positive integer, k+m is such a number that the organopolysiloxane has a viscosity of 10 to 1,000,000 mPa·s at 25° C.

3. The composition of claim 1 wherein component (A) is an organopolysiloxane of resin structure having the average compositional formula:

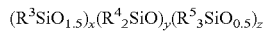

wherein $R^3$, $R^4$ and $R^5$ are each independently a substituted or unsubstituted monovalent hydrocarbon group, 2 to 45 mol% of the entire monovalent hydrocarbon groups being vinyl, x, y and z representative of the molar ratio of corresponding siloxane units are such numbers that x/(x+y+z) is 0.3 to 0.95, y/(x+y+z) is 0.05 to 0.50, and z/(x+y+z) is 0 to 0.05.

4. The composition of claim 1 wherein 0.05 to 5 parts by weight of the mold release agent (D) is present per 100 parts by weight of the organopolysiloxane (A).

5. A silicone lens obtained by molding and curing the composition of claim 1.

6. An LED device comprising the silicone lens of claim 5.

7. The composition of claim 1 wherein the mold release agent (D) is agitated and mixed with components (A), (B) and (C).

* * * * *